US009091751B2

(12) United States Patent
Funayama et al.

(10) Patent No.: US 9,091,751 B2
(45) Date of Patent: Jul. 28, 2015

(54) SOUND SOURCE DETECTION SYSTEM

(71) Applicants: Ryuji Funayama, Yokohama (JP); Jun Sato, Susono (JP); Osami Yamamoto, Nagoya (JP); Kensaku Asahi, Nagoya (JP); Hideki Banno, Tokai (JP); Keiichi Yamada, Nissin (JP); Akira Ogawa, Tokyo (JP); Yuichi Tanaka, Seto (JP); Hiroyuki Hoshino, Nagoya (JP)

(72) Inventors: Ryuji Funayama, Yokohama (JP); Jun Sato, Susono (JP); Osami Yamamoto, Nagoya (JP); Kensaku Asahi, Nagoya (JP); Hideki Banno, Tokai (JP); Keiichi Yamada, Nissin (JP); Akira Ogawa, Tokyo (JP); Yuichi Tanaka, Seto (JP); Hiroyuki Hoshino, Nagoya (JP)

(73) Assignees: TOYOTA JIDOSHA KABUSHIKI KAISHA, Aichi-ken (JP); MEIJO UNIVERSITY, Nagoya (JP)

( * ) Notice: Subject to any disclaimer, the term of this patent is extended or adjusted under 35 U.S.C. 154(b) by 0 days.

(21) Appl. No.: 14/346,033

(22) PCT Filed: Sep. 19, 2012

(86) PCT No.: PCT/IB2012/001821
§ 371 (c)(1),
(2) Date: Mar. 20, 2014

(87) PCT Pub. No.: WO2013/041939
PCT Pub. Date: Mar. 28, 2013

(65) Prior Publication Data
US 2014/0241126 A1    Aug. 28, 2014

(30) Foreign Application Priority Data
Sep. 20, 2011   (JP) .................................. 2011-205151

(51) Int. Cl.
G01S 3/80      (2006.01)
G01S 3/808     (2006.01)
G01S 11/14     (2006.01)

(52) U.S. Cl.
CPC  *G01S 3/808* (2013.01); *G01S 11/14* (2013.01)

(58) Field of Classification Search
CPC ................................ G01S 2/808; G01S 11/14
USPC ................... 367/906, 136, 98; 340/903, 943; 701/301
See application file for complete search history.

(56) References Cited

U.S. PATENT DOCUMENTS 5,153,372 A * 10/1992 Deuss et al. ................... 102/427
5,504,717 A *  4/1996 Sharkey et al. ............... 367/124

(Continued)

FOREIGN PATENT DOCUMENTS

EP      0414203 A1     8/1990
JP    05-092767 U    12/1993

OTHER PUBLICATIONS

"Autonomous Audio-Supported Learning of Visual Classifiers for Traffic Monitoring", IEEE Intelligent Systems, IEEE, vol. 25, No. 3, May 1, 2010, pp. 15-23.

(Continued)

*Primary Examiner* — Isam Alsomiri
*Assistant Examiner* — Hovhannes Baghdasaryan
(74) *Attorney, Agent, or Firm* — Sughrue Mion, PLLC

(57) ABSTRACT

A sound source detection system for detecting a sound source (e.g., running sound of a vehicle) based on sound collected by microphones extracts characteristic amounts from the sound collected by the microphones, sets a plurality of classes according to the position of the sound source by a multi-class pattern recognition method (e.g., multi-class SVM) using the characteristic amounts, extracts characteristic amounts from sound collected by the microphones for detection of a sound source, determines a class to which the extracted characteristic amounts belong, from the preset plurality of classes, and estimates the sound source based on the class.

11 Claims, 8 Drawing Sheets

(56) References Cited

U.S. PATENT DOCUMENTS

| | | | |
|---|---|---|---|
| 5,530,483 A * | 6/1996 | Cooper et al. | 348/518 |
| 5,675,489 A * | 10/1997 | Pomerleau | 701/28 |
| 5,973,998 A * | 10/1999 | Showen et al. | 367/124 |
| 6,400,647 B1 * | 6/2002 | Huntress | 367/136 |
| 6,556,682 B1 * | 4/2003 | Gilloire et al. | 381/66 |
| 8,248,887 B2 * | 8/2012 | Akiyama et al. | 367/98 |
| 2005/0047277 A1 * | 3/2005 | Chamberlain et al. | 367/136 |
| 2006/0256660 A1 * | 11/2006 | Berger | 367/124 |
| 2007/0125951 A1 * | 6/2007 | Snider et al. | 250/363.03 |
| 2010/0226210 A1 * | 9/2010 | Kordis et al. | 367/127 |
| 2010/0228482 A1 * | 9/2010 | Yonak | 701/301 |
| 2010/0271905 A1 * | 10/2010 | Khan et al. | 367/124 |
| 2011/0175755 A1 * | 7/2011 | Yoshioka et al. | 340/995.1 |
| 2012/0195433 A1 * | 8/2012 | Eppolito et al. | 381/1 |
| 2012/0300587 A1 * | 11/2012 | Azimi-Sadjadi et al. | 367/127 |
| 2012/0314542 A1 * | 12/2012 | Ledeczi et al. | 367/127 |
| 2013/0328701 A1 * | 12/2013 | Sato et al. | 340/943 |

OTHER PUBLICATIONS

"Application of passive acoustic radar to automatic localization, tracking and classification of sound sources", Information Technology (ICIT), 2010 2nd International Conference on, IEEE, Jun. 28, 2010, pp. 67-70.

"A study on using linear microphone array-based acoustic sensing to detect approaching vehicles", Communications and Information Technologies (ISCIT), 2010 International Symposium on, IEEE, Oct. 26, 2010, pp. 182-186.

"Estimation of Speed and Arrival Time of Approaching Vehicles Using Sound", The Institute of Electronics, Information and Communication Engineers, IEICE Technical Report, Japan, Sep. 20, 2007, vol. 107, No. 238 (SP2007 45-56), pp. 13-18.

Partial translation of Office Action issued to JP 2011-205151 on Sep. 10, 2013.

* cited by examiner

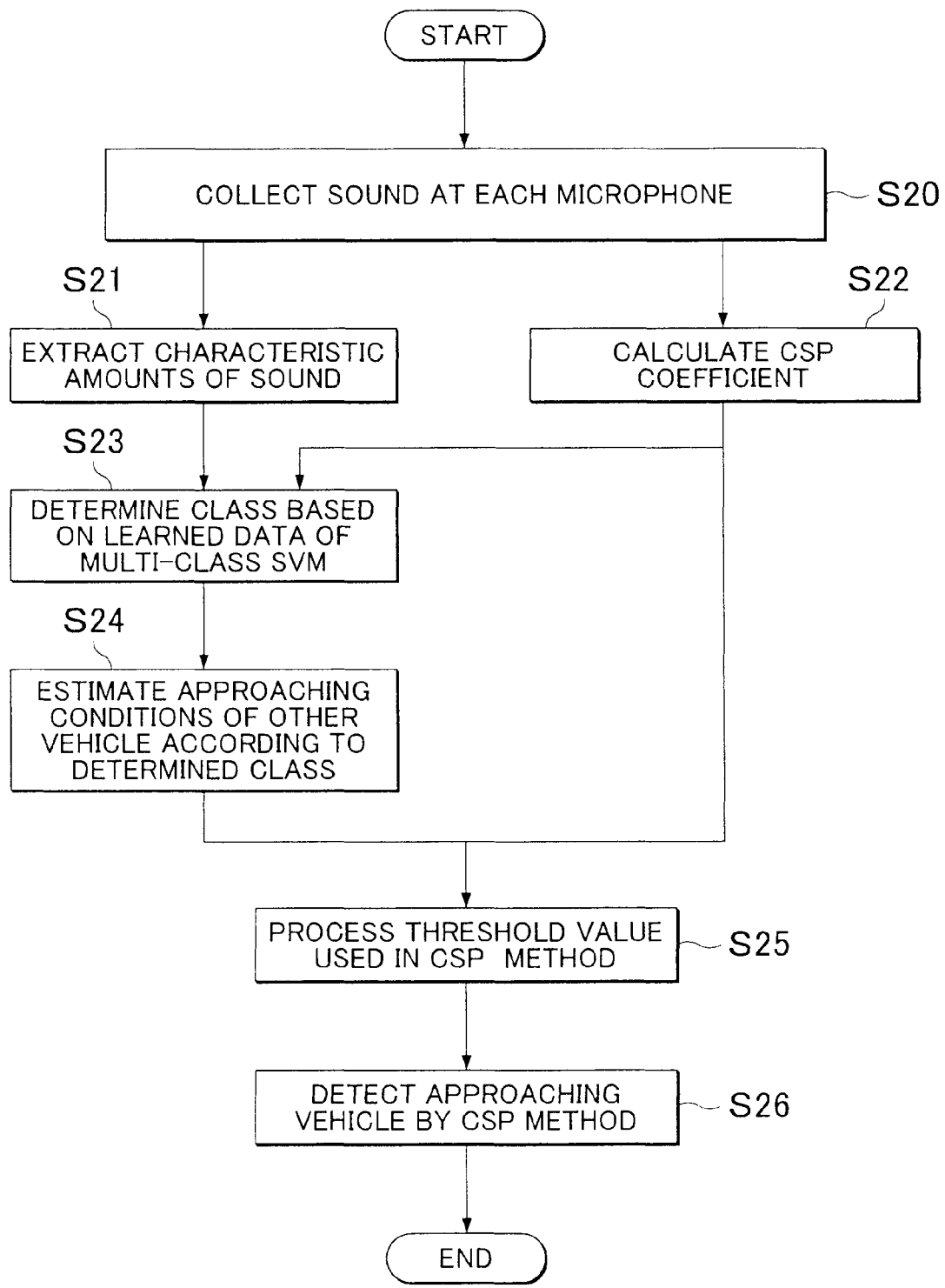

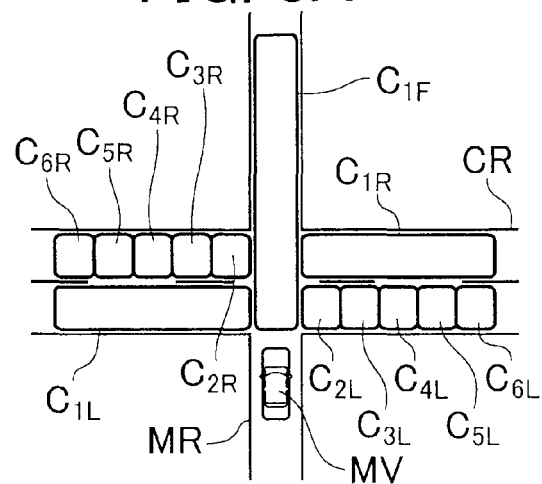
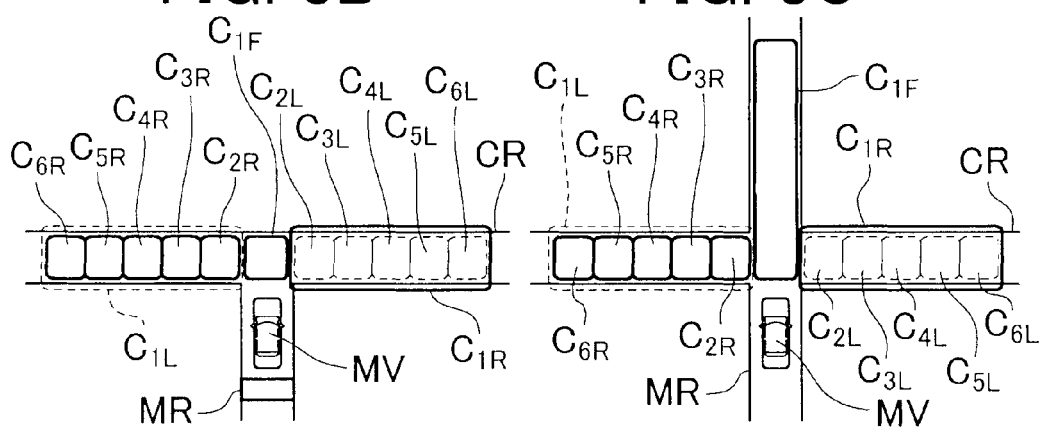
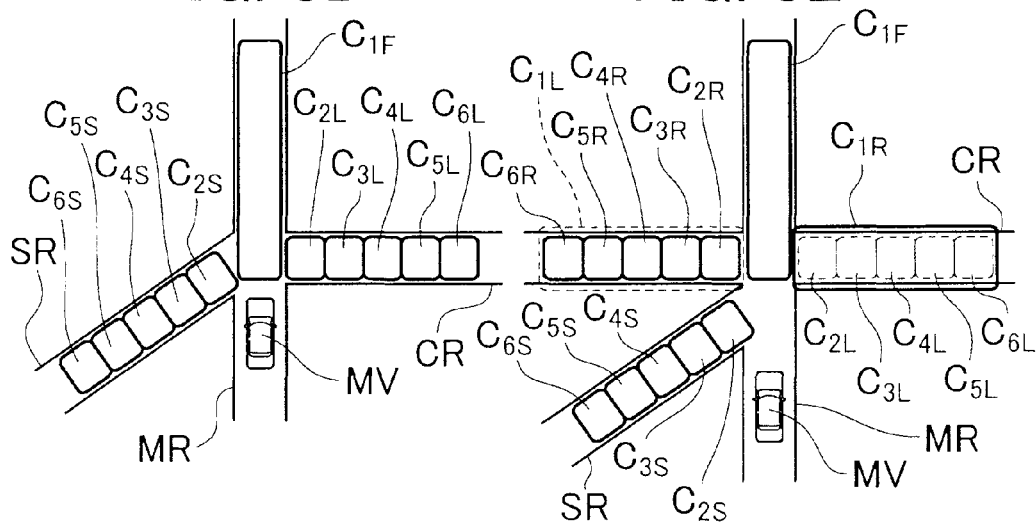

SOUND SOURCE DETECTION SYSTEM

BACKGROUND OF THE INVENTION

1. Field of the Invention

The invention relates to a sound source detection system that detects a sound source based on sound collected by a sound collecting device, such as microphones.

2. Description of Related Art

A sound source detection system has two or more microphones that collect ambient sound, and is operable to detect a moving direction, etc. of a sound source (e.g., running sound of a vehicle), based on a delay of arrival, i.e., a difference in arrival time between sounds received by the respective microphones, and so forth. In a system described in Japanese Utility Model Application Publication No. 5-92767 (JP 5-92767 U), electric signals generated from two or more microphones placed at a given interval are passed through bandpass filters for removing frequency components of a low frequency band and a high frequency band, respectively, from the electric signals, to be converted into corrected electric signals. Then, the power of a given frequency band in which characteristics of vehicle running sound appears is calculated from the corrected electric signal, and it is determined that an approaching vehicle is present when the power level is larger than a threshold value. On the other hand, an unnecessary noise component is removed from the corrected electric signals, which are thus converted into noise suppression signals, and a cross-correlation between the noise suppression signals of the two or more microphones is calculated, so as to calculate the approaching direction of the approaching vehicle based on a delay of arrival at which the cross-correlation is at the maximum.

When the vehicle moves at a high speed, the maximum detection distance is desired to be sufficiently long since information on a distant approaching vehicle is needed. However, in the method of detecting an approaching vehicle based on a delay of arrival, or a difference in arrival time between sounds received by a pair of microphones, the distance between the pair of microphones is limited by the vehicle width (consequently, the spatial resolution (the performance at the maximum detection distance) is limited), or aliasing occurs in a target frequency band; therefore, as the distance between the approaching vehicle and the self-vehicle increases, the ability to detect the approaching vehicle is reduced, and it becomes difficult to detect the approaching direction, distance, etc. In particular, when the threshold value is used when making a determination on the presence of an approaching vehicle, it is considerably difficult to appropriately set the threshold value, and the detection accuracy largely varies depending on the threshold value. Also, in the method of detecting an approaching vehicle based on the delay of arrival of sounds received by the pair of microphones, the approaching direction cannot be found unless change in the delay of arrival with time is determined; therefore, it cannot be determined, from a single detection, whether the vehicle is approaching the self-vehicle or moving away from the self-vehicle.

SUMMARY OF THE INVENTION

The invention provides a sound source detection system that is adapted to detect an approaching vehicle with high accuracy.

A sound source detection system according to one aspect of the invention, which is adapted to detect a sound source based on sound collected by a sound collecting device, includes: a classifying unit that extracts a plurality of characteristic amounts from the sound collected by the sound collecting device, and sets a plurality of classes according to a position of the sound source by a multi-class pattern recognition method, using the characteristic amounts, a class determining unit that extracts the characteristic amounts from the sound collected by the sound collecting device when detecting the sound source, and determines a class to which the extracted characteristic amounts belong, from the plurality of classes set by the classifying unit, and a sound source estimating unit that estimates the sound source, based on the class determined by the class determining unit.

In the sound source detection system, the sound collecting device collects sound under various conditions of the sound source (e.g., running sound of a vehicle), before the sound source is actually detected. The conditions of the sound source may include the position of the sound source corresponding to each time (interval) it takes the sound source to pass the front of the system, the position corresponding each distance to the sound source, and so forth. For example, sound is collected when the sound source is within a range (position) of 5 to 4 seconds before the sound source passes the front of the system, a range of 4 to 3 seconds before the passage, a range of 3 to 2 second before the passage, a range of 2 to 1 before the passage, a range of 1 to 0 second before the passage, and a range after the passage. Then, in the sound source detection system, the classifying unit extracts the characteristic amounts of sound for each condition of the sound source, using sound data collected for each condition of the sound source, and sets a plurality of classes according to the position of the sound source by the multi-class pattern recognition method, using the characteristic amounts of the sound. The plurality of classes set according to the position of the sound source may be classes of positions corresponding respective lengths of time it takes the sound source to pass the front of the system, or classes of positions corresponding to respective distances to the sound source, for example. For example, information for separating a class of 5 to 4 seconds before passing the front of the system, a class of 4 to 3 seconds before the passage, 3 to 2 seconds before the passage, 2 to 1 seconds before the passage, 1 to 0 second before the passage, and a class after the passage, from each other using the characteristic amounts is obtained. Then, when the sound source detection system operates to actually detect a sound source, the sound collecting device collects sound, and the class determining unit extracts characteristic amounts from sound data of the collected sound, and determines which class to which the extracted characteristic amounts belong, from the plurality of classes set by the classifying unit. Further, in the sound source detection system, the sound source estimating unit estimates conditions of the sound source based on the class thus determined. For example, when the class of 2 to 1 sec. from the passage is determined, the sound source is estimated to be located at a position at which the sound source will pass the front of the system 2 to 1 sec. after the present time. Thus, the sound source detection system sets a plurality of classes according to the conditions of the sound source by the multi-class pattern recognition method, and determines which class to which the sound characteristic amounts of the sound source belong, so that the sound source can be detected with high accuracy. In the method utilizing classification by the multi-class pattern recognition method, the detection accuracy does not change depending on the position of the sound source, for example, and no threshold value is used for making a determination, thus permitting flexible detection and assuring improved detection accuracy. Also, it can be determined, by determining a class once, whether the sound source is approaching the system or moving away from the system.

The sound source detection system according to the above aspect of the invention may further include a sound source detecting unit that calculates a correlation value of sounds respectively collected by a plurality of microphones that constitute the sound collecting device, and detects the sound source by comparing the calculated correlation value with a threshold value, and a correcting unit that corrects the threshold value of the sound source detecting unit, based on a detection result obtained by the sound source detecting unit and an estimation result obtained by the sound source estimating unit. In this system, the sound source detecting unit detects the sound source by comparing the correlation value with the threshold value corrected by the correcting unit.

In the sound source detection system, when the two or more microphones collect sounds, for actual detection, of a sound source, the sound source detecting unit calculates a correlation value of the sounds collected by the respective microphones, and detects the sound source by comparing the correlation value with the threshold value. Also, in the sound source detection system, when a certain class is determined by the class determining unit, the sound source estimating unit estimates the conditions of the sound source based on the class thus determined. If the sound source is detected by these two methods, and the position (distance, time), moving direction, etc. of the sound source detected by one of the two methods approximately coincide with those detected by the other method, the sound source is detected with high reliability by the sound source detecting unit and the sound source estimating unit, and the correlation value is calculated with high reliability by the sound source detecting unit. Thus, in the sound source detection system, when high reliability is assured based on the detection result obtained by the sound source detecting unit and the estimation result obtained by the sound source estimating unit, the correcting unit corrects the threshold value of the sound source detecting unit. For example, when the reliability is high, the threshold value is set to a value with which the sound source is more likely to be detected, as compared with a generally used threshold value. Then, in the sound source detection system, the sound source detecting unit detects the sound source by comparing the correlation value with the corrected threshold value. Thus, in the sound source detection system, the threshold value for use in the method using the sound correlation value is corrected based on the detection result obtained in the method using the sound correlation value and the detection result obtained in the method using classification, so that the sound source can be detected with improved stability by the method using the sound correlation value. For example, if noise is temporarily mixed into the collected sound, and the correlation value is reduced, the sound source may not be temporarily detected if the generally used threshold value is used for making a determination, and detection and non-detection of the sound source may be repeated. However, if the threshold value is corrected to a smaller value, the sound source can be continuously and stably detected even if the correlation value is reduced.

In the sound source detection system according to the above aspect of the invention, the classifying unit may set the plurality of classes according to the moving direction of the sound source. When the sound source is a vehicle (running sound), and the vehicle is approaching a self-vehicle on which the system is installed, on a road that intersects with a road on which the self-vehicle is running, the vehicle may approach the self-vehicle from the right-hand side of the self-vehicle, or may approach the self-vehicle from the left-hand side of the self-vehicle. Thus, the moving direction of the approaching vehicle may be different even if the length of time it takes the approaching vehicle to pass the front of the self-vehicle or the distance from the approaching vehicle to the self-vehicle is equal; therefore, the classes are set in view of the moving direction as well as the position of the approaching vehicle. With the classes thus set in view of the moving direction of the sound source as well as the position thereof, the conditions of the sound source can be estimated in greater detail, and the sound source can be detected with high accuracy.

In the sound source detection system according to the above aspect of the invention, the classifying unit may set the plurality of classes according to the shape of the road and/or the traffic regulations. When the sound source is a vehicle, the vehicle runs on a road, and classes may be set based on the shape of the road. Also, since the vehicle runs according to the traffic regulations (for example, the moving direction of the vehicle is only one direction when the road permits one-way traffic), classes may be set based on the traffic regulations. Thus, in the sound source detection system as described above, most appropriate classes can be easily set by performing the classification in view of the road shape and the traffic regulations.

In the sound source detection system according to the above aspect of the invention, the classifying unit may set a plurality of classes according to the type of the vehicle. When the sound source is a vehicle, the running sound is different between a large vehicle and an ordinary vehicle, for example, and the characteristic amounts of the sound are also different between these types of vehicles. Accordingly, the type of the vehicle can be determined from the sound characteristic amounts, and classes can be set according to the type of the vehicle. The vehicles may be roughly classified into several types, such as a large vehicle, ordinary passenger vehicle, light passenger vehicle, and a motorcycle, or may be classified into more detailed types. Thus, in the sound source detection system as described above, the classes are set in view of the type of the vehicle, so that the conditions of the approaching vehicle (sound source) can be estimated in greater detail, and the approaching vehicle can be detected with improved accuracy.

According to the present invention, a plurality of classes are set according to conditions of the sound source by the multi-class pattern recognition method, and it is determined which class to which sound characteristic amounts of the sound source belong, so that the sound source can be detected with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A through FIG. 6E are views showing one example of processing result obtained by the estimating device of FIG. 5, wherein FIG. 6A shows changes in the result of class determination with time, FIG. 6B shows changes in the correlation value with time, FIG. 6C shows changes in the angle of direction with time, FIG. 6D shows changes in the detection result before correction of a threshold value, and FIG. 6E shows changes in the detection result after correction of the threshold value;

FIG. 7 is a flowchart illustrating the flow of processing performed in the estimating device of FIG. 5; and FIG. 8A through FIG. 8E are views showing examples of classes for use in the multi-class SVM, which classes are set according to the road shape and traffic regulations, wherein FIG. 8A illustrates the case where a road that intersects with another road at an intersection of a crossroad has one lane each way, FIG. 8B illustrates the case where a road that intersects with another road at a T-junction has no lane, FIG. 8C illustrates the case where a road that intersects with another road at an intersection of a crossroad has no lane, FIG. 8D illustrates the case where a road that intersects with another road at an intersection of a modified crossroad permits one-way traffic, and FIG. 8E illustrates the case where roads that intersect at an intersection of five roads includes a road having no lane and a road that permits one-way traffic.

DETAILED DESCRIPTION OF EMBODIMENTS

Figure 1:
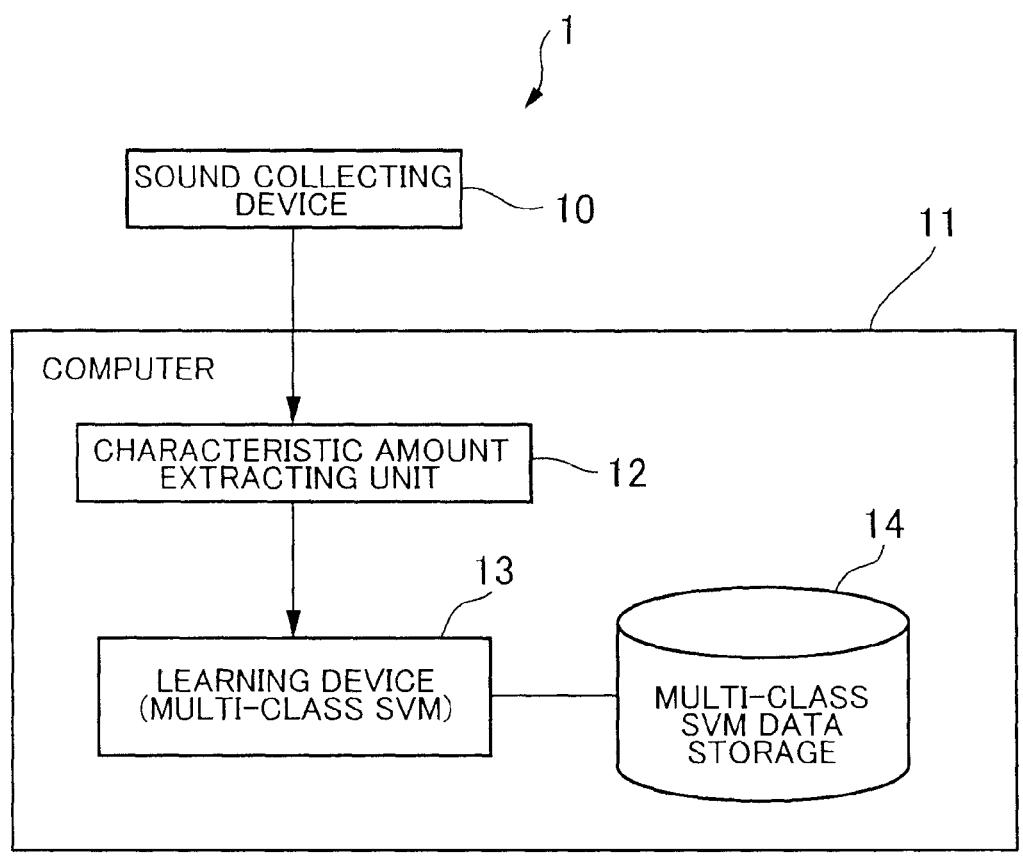
FIG. 1 is a view showing the configuration of a learning device of a sound source detection system according to one embodiment of the invention.

A sound source detection system according to one embodiment of the invention will be described with reference to the drawings. In the drawings, the same reference numerals are assigned to the same or corresponding elements, of which repeated explanation will not be provided.

In this embodiment, the sound source detection system according to the invention is used as an approaching vehicle detection system that principally consists of a learning device that performs learning in advance during development of a vehicle, and an estimating device that is installed on the vehicle at the time of shipment and is adapted to actually detect an approaching vehicle. The approaching vehicle detection system of this embodiment detects a vehicle that is approaching the self-vehicle (i.e., the vehicle on which the approaching vehicle detection system is installed), based on each sound collected by each of a plurality of (two or more) microphones (namely, detects running sound of a vehicle (sound source) around the self-vehicle), and provides information on the approaching vehicle to a driving assist system. In particular, the approaching vehicle detection system of this embodiment classifies conditions of an approaching vehicle by learning, using the multi-class SVM (Multi-class Support Vector Machine) (multi-class pattern recognition method), and estimates the approaching vehicle using data learned by the classification. The present invention may be embodied in two forms that are different in terms of processing at the estimating device, namely, a first embodiment in which an approaching vehicle is detected based on a class determined by the multi-class SVM, and a second embodiment in which a threshold value for use in the CSP (Cross-power Spectrum Phase analysis) method is corrected based on a class determined by the multi-class SVM, and an approaching vehicle is detected according to the CSP method.

The running sound of the vehicle mainly consists of road noise (sound of friction between tire surfaces and a road surface) and pattern noise (air vortices (compression/release) in tire grooves). The running sound may further include engine sound or noise and wind noise, for example. The range of frequency components of the vehicle running sound may be measured in advance by experiment, or the like.

The SVM is a pattern recognition method using supervised learning. According to the multi-class SVM, each of decision surfaces separating two or more classes in a multidimensional vector space is obtained (by learning), and which class, among the classes thus learned, to which the running sound (sound source) belongs is estimated. In this embodiment, a plurality of characteristic amounts extracted from each sound data collected by the two or more microphones are used as multidimensional vectors, and classes are set in accordance with the conditions of the vehicle approaching the self-vehicle.

The CSP method is a method of estimating the position of a sound source using Fourier transform. In the CPS method, a cross-correlation value (CSP coefficient) is obtained by matching respective sound data collected by the two or more microphones in a frequency region, and it is determined that a sound source is present when the cross-correlation value is equal to or larger than a threshold value. When the sound source is present, the direction, position, etc. of the sound source are obtained from a delay of arrival at which the cross-correlation value is at the maximum.

Figure 2:
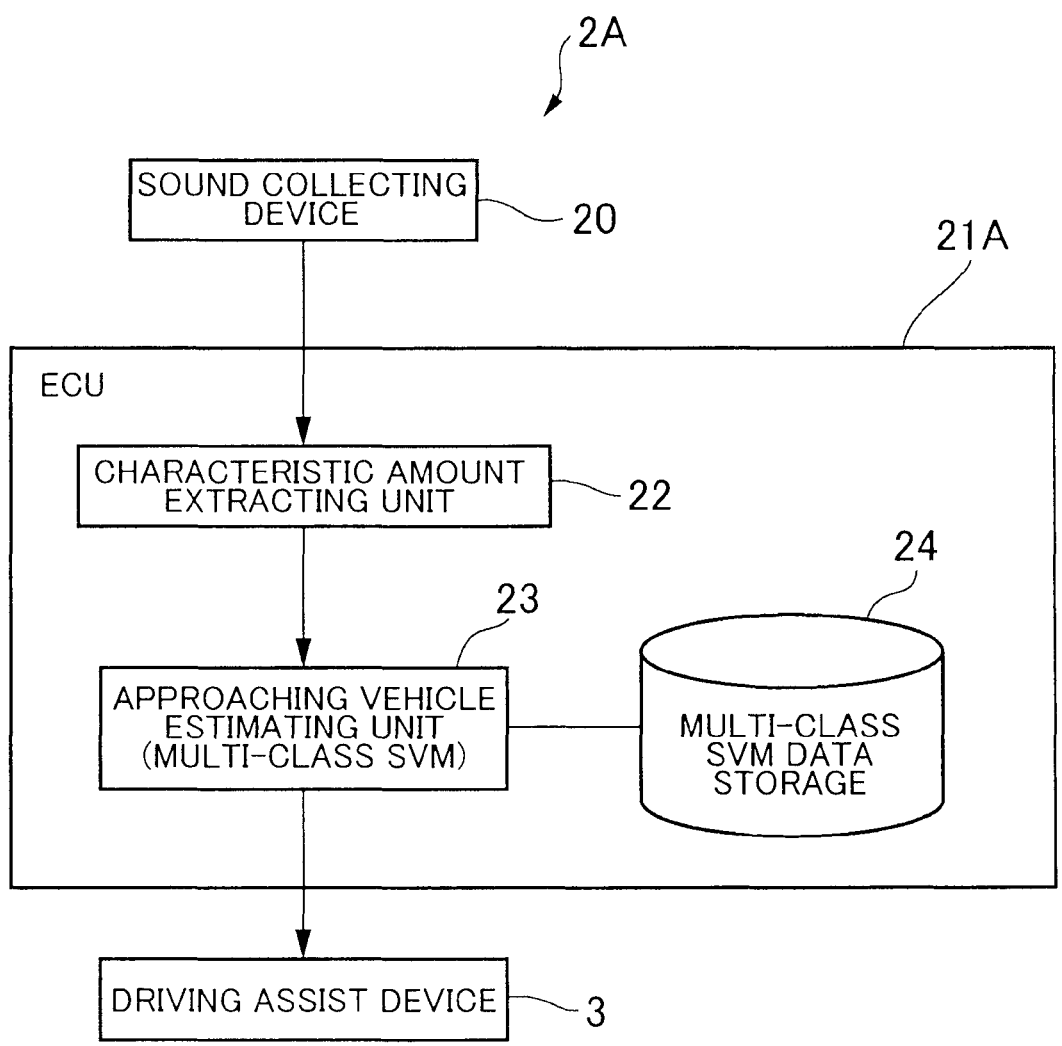
FIG. 2 is a view showing the configuration of an estimating device according to a first embodiment of the invention.
Figure 3:
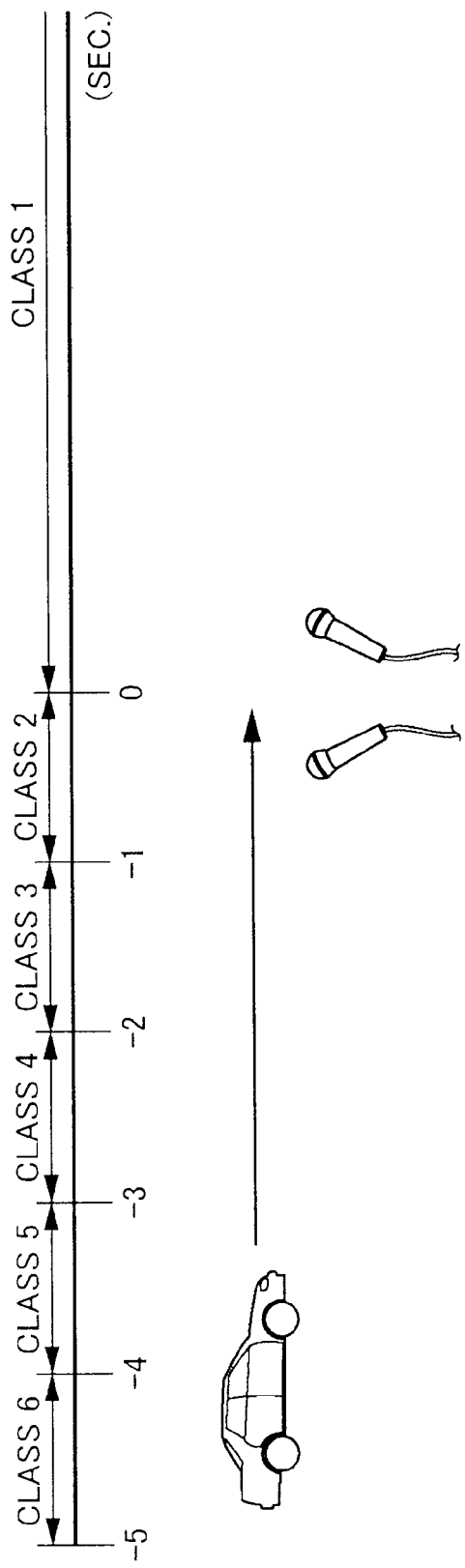
FIG. 3 is a view showing one example of a set of classes used in a multi-class SVM.

Referring to FIG. 1 through FIG. 3, the approaching vehicle detection system according to the first embodiment of the invention will be described. FIG. 1 illustrates the configuration of the learning device of this embodiment. FIG. 2 illustrates the configuration of the estimating device of the first embodiment. FIG. 3 shows one example of a set of classes used in the multi-class SVM.

The approaching vehicle detection system according to the first embodiment consists of the learning device 1 that performs learning in advance, and the estimating device 2A that is installed on the vehicle and is operable to detect an approaching vehicle. The learning device 1 performs learning in advance during vehicle development, and data obtained by learning is installed on the estimating device 2A of each vehicle. To perform learning in advance, an actual-vehicle experiment is conducted using an experimental vehicle that collects running sound, and an approaching vehicle (a sound source that generates the running sound) which approaches the experimental vehicle. In the experiment, the approaching vehicle is caused to run under various approaching conditions on roads having various road shapes.

The learning device 1 will be described. The learning device 1 collects running sound under various vehicle approaching conditions, and classifies the vehicle approaching conditions according to the multi-class SVM using a multiplicity of pieces of running sound data. The learning device 1 includes a sound collecting device 10 and a computer 11. The learning device 1 may be configured such that the sound collecting device 10 and the computer 11 are both installed on the experimental vehicle, or may be configured such that the sound collecting device 10 and a data storage device are installed on the experimental vehicle, and running sound data is transmitted from the data storage device to an indoor computer as the computer 11. In this embodiment, the computer 11 of the learning device 1 corresponds to the above-mentioned classifying unit.

In this embodiment, classes are set corresponding to a plurality of time intervals, with reference to the time at which the approaching vehicle passes the front of the vehicle. Also, the classes are set in view of the moving direction of the approaching vehicle. In this embodiment, classes corresponding to six time intervals are set. As shown in FIG. 3, when a point in time at which an approaching vehicle passes the front of the vehicle (microphones) collecting running sound is set as a reference point (0 sec.), and the approaching vehicle moves from the left to the right on a road that intersects with a road of the vehicle collecting running, sound, an interval of 5 to 4 seconds prior to the reference point on the left-hand side of the intersection of the above roads is set as Class 6, an interval of 4 to 3 seconds prior to the reference point is set as Class 5, an interval of 3 to 2 seconds prior to the reference point is set as Class 4, an interval of 2 to 1 second(s) prior to the reference point is set as Class 3, and an interval of 1 to 0 second prior to the reference point is set as Class 2, while an interval (about 5 seconds) after passing the front of the vehicle on the right-hand side of the intersection is set as Class 1. FIG. 3 illustrates the case where the approaching vehicle moves from the left to the right. In the case where the approaching vehicle moves from the right to the left, too, six classes are set in a direction opposite to that of FIG. 3 in the same manner.

While the number of classes is six in this embodiment, the minimum number of classes may be two. For example, an interval of 5 to 0 seconds before the approaching vehicle passes the front of the vehicle is set as Class 2, and an interval of 0 to 5 seconds after the passage is set as Class 1. However, it is preferable to set two or more classes before passing the front, and set one class after passing the front, since it is actually desirable to determine approaching of the vehicle step by step. Also, classes may be set, not within the range of 5 to 0 seconds before passing the front, but within another range, such as a range of 6 to 0 seconds, or a range of 3 to 0 seconds. While classes corresponding to respective time intervals are set for the position of the approaching vehicle, classes corresponding to respective distances from the approaching vehicle to the vehicle (microphones) may be set for the position of the approaching vehicle.

The sound collecting device 10 has two or more microphones, which constitute one or more pairs of microphones. The two or more microphones are located at a front end portion of the vehicle and arranged side by side in the vehicle width direction (lateral direction). The microphones may not be arranged side by side, but may be located at vertically different positions, for example. Each of the microphones is an acousto-electric converter, which collects ambient sound outside of the vehicle, and converts the collected sound into an electric signal. Regarding the number of microphones, the sound collecting device 10 has eight microphones, which constitute five pairs of microphones, for example, thus assuring improved anti-noise performance.

In the actual-vehicle experiment, each microphone of the sound collecting device 10 collects sound when the experimental vehicle is stopped ahead of an intersection of roads having various road shapes (e.g., crossroad, T-junction, junction of five roads) (or the experimental vehicle may be running toward the intersection), and an approaching vehicle is caused to run on a road that intersects with the road on which the experimental vehicle is stopped (or running) (the vehicle is caused to run in each direction if the road is of a type that permits the vehicle to run in both directions). The sound data thus collected is stored in a data storage device. The sound data may not be stored in the data storage device, but may be sequentially transmitted to the computer 11. Also, each time the approaching vehicle runs, a point in time at which the approaching vehicle passes the front of the experimental vehicle is determined, and the time point (time) is stored in association with the sound data. The passage of the approaching vehicle may be detected by using a radar sensor, or the like, or may be determined by a person. In the actual-vehicle experiment, the vehicle is caused to run a plurality of times (e.g., 20 times) under the same conditions, and a plurality of pieces of sound data are obtained under the same conditions.

The computer 11 may be a personal computer, for example, and consists principally of a characteristic amount extracting unit 12, a learning unit 13, and a multi-class SVM data storage 14. The computer 11 receives sound data (electric signal) of sound collected by each microphone of the sound collecting device 10 for each moving direction with respect to each road shape. The computer 11 performs preprocessing on each sound data, more specifically, converts an analog electric signal into a digital signal, and removes specified frequency bands (a high frequency band that is higher than a given frequency band that sufficiently includes the frequency band of the vehicle running sound, and a low frequency band that is lower than the given frequency band) from the digital electric signal.

The characteristic amount extracting unit 12 extracts characteristic amounts of sound from the sound data of each microphone which has been subjected to preprocessing, for each moving direction with respect to each road shape. In this embodiment, fourteen characteristic amounts as indicated below are used as the characteristic amounts. As characteristic amounts extracted from sound data of each pair of microphones, delay of arrival information, the average value of the delay of arrival information (e.g., the average value of the past 20 pieces of data), a peak value of the CSP coefficient (cross-correlation value), and the average value of the peak values of the CSP coefficients (e.g., the average value of the past 20 pieces of data) are extracted. These four characteristic amounts are extracted for the case where the left-side microphone of the pair of microphones is used as a reference, and the case where the right-side microphone is used as a reference, respectively; thus, eight characteristic amounts are obtained. The average value of the past 20 pieces of data is the average value of respective data obtained in the past two seconds, when data is processed at intervals of 100 msec. As characteristic amounts extracted from sound data of each microphone, six characteristic amounts, namely, the spectral power values (intensities) in six frequency bands (500-630 Hz, 630-793 Hz, 793-1000 Hz, 1000-1260 Hz, 1260-1587 Hz, and 1587-2000 Hz), are extracted. The CSP coefficient (cross-correlation value) and the delay of arrival are calculated according to the known CSP method.

Assuming that the vehicle on which the sound collecting device 10 is installed does not move, the learning device 13 obtains decision surfaces for separating six classes on a fourteen-dimensional vector space using the fourteen characteristic amounts extracted by the characteristic amount extracting unit 12, according to the multi-class SVM, for each moving direction with respect to each road shape. At this time, the learning unit 13 also performs learning for the seventh class (e.g., a class prior to five seconds before passing the front, or a class after five seconds after passing the front) other than the set six classes, according to the multi-class SVM. The decision surfaces are obtained according to the multi-class SVM by a known method, which will not be described in detail. While it is assumed that the vehicle equipped with the sound collecting device 10 is not moving, it may be assumed that the vehicle is moving. If it is assumed that the vehicle is not moving, the method using the multi-class SVM is simply implemented, thus assuring improved performance.

The multi-class SVM data storage 14 is constructed in a given region of a storage device of the computer 11, in which learned data obtained by the learning unit 13 according to the multi-class SVM is stored. The data stored in the data storage 14 is data indicative of decision surfaces separating six classes on the fourteen-dimensional vector space provided by the fourteen characteristic amounts, for each moving direction with respect to each road shape.

The estimating device 2A will be described. The estimating device 2A is installed on the vehicle, and is adapted to collect ambient sound during running of the vehicle, determine which class to which the collected sound data (the fourteen characteristic amounts) belongs according to the multi-class SVM, and estimate the conditions of an approaching vehicle, based on the class thus determined. The estimating device 2A includes a sound collecting device 20, and an ECU (Electronic Control Unit) 21A.

The sound collecting device 20 is constructed similarly to the sound collecting device 10 of the learning device 1. In the sound collecting device 20, each microphone collects sound during running of the vehicle (including a temporary stop at an intersection, for example), and transmits the collected sound data to the ECU 21A.

The ECU 21A is an electronic control unit comprised of a CPU (Central Processing Unit), a ROM (Read-Only Memory), a RAM (Random Access Memory), and so forth, and performs integrated control on, the estimating device 2A. The ECU 21A has a characteristic amount extracting unit 22, an approaching vehicle estimating unit 23, and a multi-class SVM data storage 24. The ECU 21A receives sound data (electric signal) indicative of sound collected by each microphone from the sound collecting device 20. The ECU 21A performs preprocessing like the preprocessing performed by the computer 11 of the learning device 1, on the sound data. In the first embodiment, the characteristic amount extracting unit 22 and the approaching vehicle estimating unit 23 correspond to the above-mentioned "class determining unit" and "sound source estimating unit", respectively.

The multi-class SVM data storage 24 is constructed in a given region of a storage device of the ECU 21A, and stores all of the learned data stored in the multi-class SVM data storage 14 of the learning device 1.

The characteristic amount extracting unit 22 performs substantially the same processing as the characteristic amount extracting unit 12 of the learning device 1. Each time the characteristic amount extracting unit 22 receives sound data of each microphone of the sound collecting device 20, the extracting unit 22 extracts fourteen characteristic amounts, using the sound data of each microphone which has been subjected to preprocessing.

The approaching vehicle estimating unit 23 determines which class to which the fourteen characteristic amounts extracted by the characteristic amount extracting unit 22 belong on the fourteen-dimensional vector space, using the learned data obtained according to the multi-class SVM and stored in the multi-class SMV data storage 24 (i.e., data indicative of decision surfaces that separate six classes on the fourteen-dimensional vector space for each moving direction with respect to each road shape). When the approaching vehicle estimating unit 23 determines that the characteristic amounts belong to the seventh class other than the set six classes (i.e., when no sound source (running sound of the vehicle) is present around the self-vehicle), it determines that there is no vehicle approaching the self-vehicle. When the approaching vehicle estimating unit 23 determines that the characteristic amounts belong to one of the set six classes (when a sound source is present around of the self-vehicle), it determines that there is a vehicle approaching the self-vehicle, and estimates approaching conditions of the approaching vehicle based on the class. The approaching conditions include how many seconds it takes for the approaching vehicle to pass the front of the self-vehicle or whether the vehicle has passed the front of the self-vehicle, what direction in which the approaching vehicle is approaching the self-vehicle, and so forth. If it is determined how many seconds it takes for the approaching vehicle to pass the front of the vehicle, an approximate distance from the approaching vehicle to the self-vehicle can be estimated from the time and the vehicle speed of the approaching vehicle (e.g., the speed limit for the road on which the approaching vehicle is running).

The ECU 21A generates approaching vehicle information based on the result of estimation by the approaching vehicle estimating unit 23, and transmits the approaching vehicle information to a driving assist device 3. The approaching vehicle information include, for example, the presence or absence of an approaching vehicle, and the approaching time and approaching direction when an approaching vehicle is present.

The driving assist device 3 consists of various types of sensors, ECU; and so forth, and is operable to assist the driver in various aspects of driving. In particular, when the driving assist device 3 receives approaching vehicle information from the estimating device 2A, it performs driving assist concerned with the approaching vehicle. For example, when there is a vehicle approaching the self-vehicle, the driving assist device 3 determines a probability of a collision of the approaching vehicle with the self-vehicle. When the driving assist device 3 determines that there is a probability of such a collision, it generates a warning to the driver, and/or provides information on the approaching vehicle to the driver. If the probability of the collision is increased, vehicle control, such as automatic braking, is performed. In this case, the probability of the collision, or the like, is determined by comparing the approaching time of the approaching vehicle with the time it takes the self-vehicle to reach the intersection concerned. The determination on the probability of the collision and the driving assist as described above are particularly useful at an intersection or junction with no traffic signals.

Figure 4:
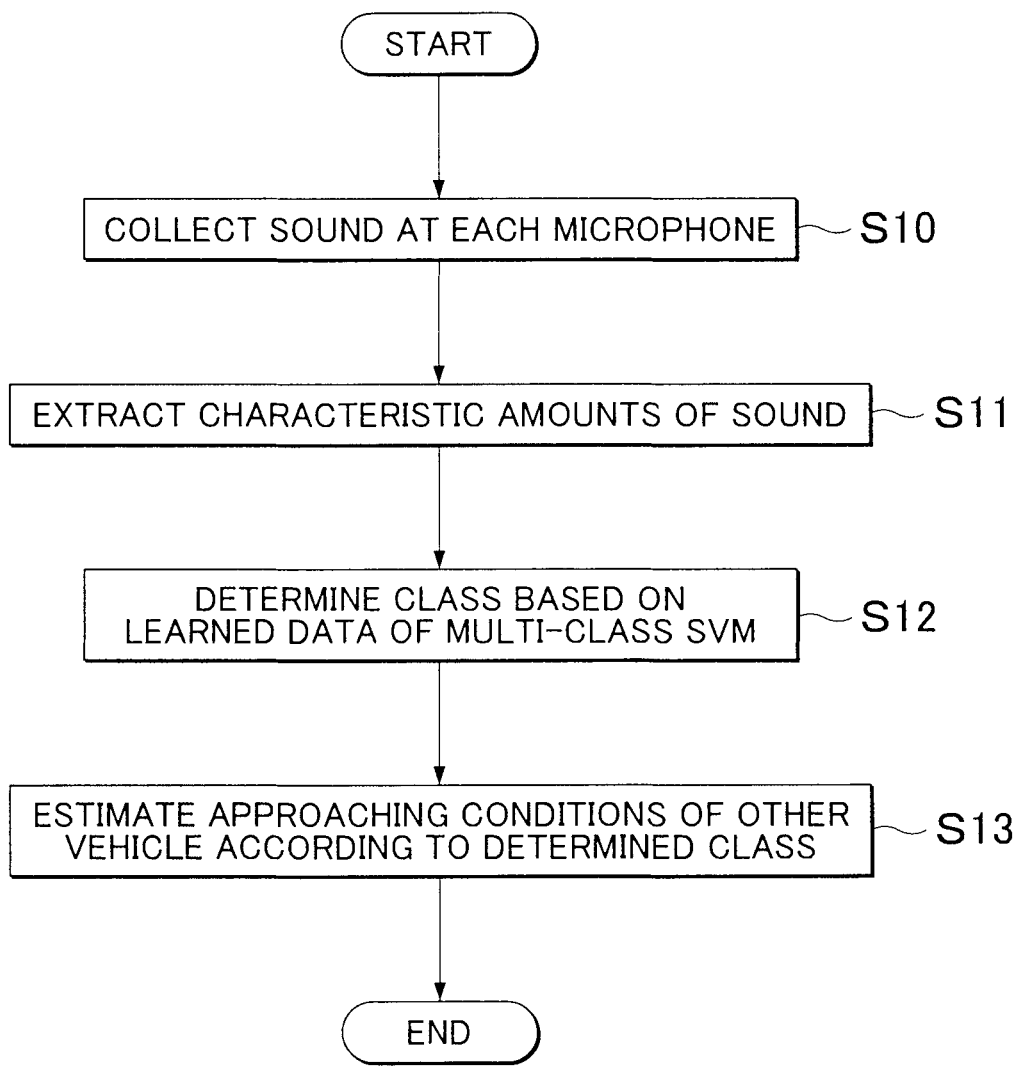
FIG. 4 is a flowchart illustrating the flow of processing performed in the estimating device of FIG. 2.

Referring to FIG. 1 through FIG. 3, the operation of the approaching vehicle detection system according to the first embodiment will be described. In particular, the operation of the estimating device 2A will be described with reference to the flowchart of FIG. 4. The flowchart of FIG. 4 illustrates the flow of operations performed by the estimating device 2A.

In an actual-vehicle experiment conducted in advance, an approaching vehicle is caused to run in all directions in which the vehicle is permitted to run, toward an intersection of each road shape, and pass the intersection. During running of the vehicle, the sound collecting device 10 of the learning device 1 installed on the vehicle collects ambient sound outside of the vehicle, with each microphone, converts the collected sound into an electric signal, and stores data of the electric signal in a data storage device. At this time, a point in time at which the approaching vehicle passes the front of the vehicle is determined, and information on the time point of passage is also stored in association with the sound data. The sound data collected by each microphone for each moving direction with respect to each road shape is transmitted to the computer 11 of the learning device 1. The computer 11 performs preprocessing on the sound data of each microphone.

The computer 11 extracts fourteen characteristic amounts from the sound data of each microphone which has been subjected to preprocessing, for each moving direction of the approaching vehicle with respect to each road shape. Then, the computer 11 obtains decision surfaces for separating six classes on the fourteen-dimensional vector space using the fourteen characteristic amounts, according to the multi-class SVM, and stores the learned data in the multi-class SVM data storage 14.

The estimating device 2A is installed on each vehicle, and the learned data of the multi-class SVM data storage 14 of the learning device 1 is stored in the multi-class SVM data storage 24 of the estimating device 2A.

In each vehicle, each microphone of the sound collecting device 20 collects ambient sound outside of the vehicle, converts the collected sound into an electric signal, and transmits the electric signal to the ECU 21A (step S10 in FIG. 4). The ECU 21A receives sound data of the two or more microphones, and performs preprocessing on the corresponding two or more sets of sound data.

Each time the ECU 21A receives sound data of each microphone from the sound collecting device 20, the ECU 21A extracts fourteen characteristic amounts using the sound data of each microphone which has been subjected to preprocessing (step S11). Then, the ECU 21A determines which class to which the extracted fourteen characteristic amounts belong, based on the learned data stored in the multi-class SVM data storage 24 (step S12). The ECU 21A estimates the approaching conditions of the vehicle approaching the self-vehicle, according to the class thus determined (step S13). If there is a class to which the characteristic amounts belong, the ECU 21A determines that an approaching vehicle (sound source) is present, and obtains the approaching time (or distance), moving direction, etc. of the approaching vehicle based on the class. Then, the ECU 21A generates approaching vehicle information based on the approaching conditions, and transmits the approaching vehicle information to the driving assist device 3.

According to the approaching vehicle detection system of the first embodiment, classes are set according to approaching conditions of the vehicle by learning using the multi-class SVM, and which class to which sound characteristic amounts of a vehicle that is actually approaching the self-vehicle belongs is determined based on the learned data, so that the approaching vehicle can be flexibly detected with high accuracy. When the method using the multi-class SVM is employed, no determination is made based on a threshold value, irrespective of whether the approaching vehicle is moving away from or toward the self-vehicle, and the detection accuracy does not change depending on setting of the threshold value; therefore, the approaching vehicle can be flexibly detected, while assuring improved detection accuracy. Also, it is possible to determine whether the approaching vehicle is approaching or moving away from the self-vehicle, by making a single determination on the class.

According to the approaching vehicle detection system, classes are set according to various parameters (e.g., a position in terms of time, moving direction), and learned, so that various conditions of the approaching vehicle, such as the time it takes the approaching vehicle to pass the front of the self-vehicle, and the moving direction, can be estimated. Also, according to the approaching vehicle detection system, various characteristic amounts, such as a delay of arrival and a cross-correlation value of sounds of each pair of microphones, and a spectrum power value in each frequency band of sound of each microphone, are used, so that the approaching conditions of the vehicle can be comprehensively classified based on various elements of sound.

Figure 5:
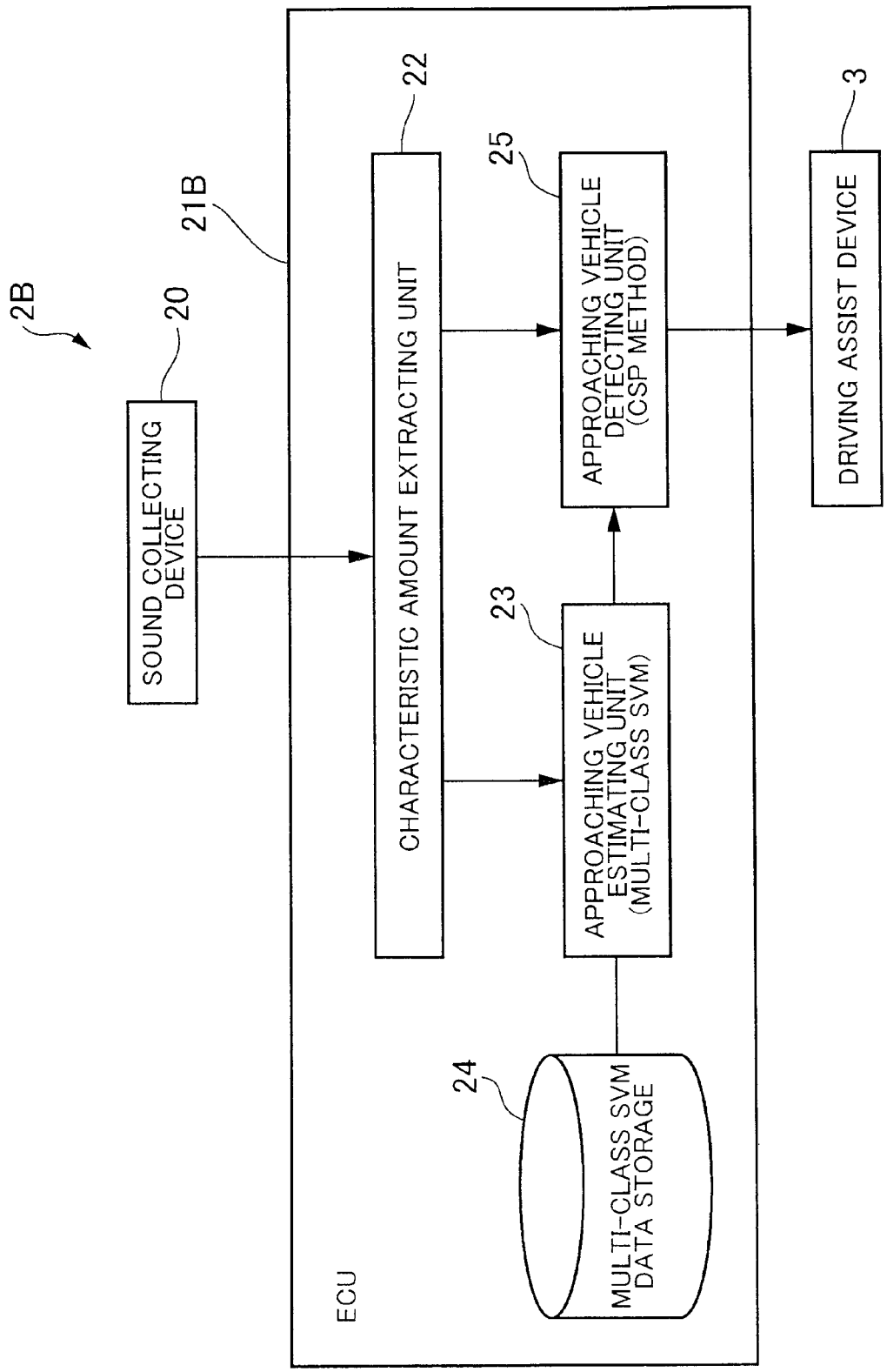
FIG. 5 is a view showing the configuration of an estimating device according to a second embodiment of the invention.

Referring to FIG. 1, FIG. 5 and FIGS. 6A-6E, an approaching vehicle detection system according to a second embodiment of the invention will be described. FIG. 5 illustrates the configuration of an estimating device according to the second embodiment. FIGS. 6A-6E show one example of processing result obtained by the estimating device of FIG. 5.

The approaching vehicle detection system according to the second embodiment is different from the approaching vehicle detection system according to the first embodiment in the processing performed in the estimating device, and consists principally of the learning device 1 that performs learning in advance, and the estimating device 2B that is installed on the vehicle and is operable to detect an approaching vehicle. The learning device 1 is substantially identical with that of the first embodiment, and therefore will not be described.

The estimating device 2B will be described. Like the estimating device 2A according to the first embodiment, the estimating device 2B determines which class to which the collected sound data belongs according to the multi-class SVM, and estimates the conditions of an approaching vehicle based on the determined class. Also, the estimating device 2B calculates a CSP coefficient from the collected sound data, and detects conditions of an approaching vehicle by the CSP method. Then, the estimating device 2B corrects a threshold value used in the CSP method, based on the conditions of the approaching vehicle estimated by the multi-class SVM and the conditions of the approaching vehicle detected by the CSP method, and detects the conditions of the approaching vehicle by the CSP method, using the corrected threshold value. The estimating device 2B includes a sound collecting device 20 and an ECU 21B. The sound collecting device 20 is substantially identical with that of the first embodiment, and therefore will not be described.

The ECU 21B is an electronic control unit that consists principally of CPU, ROM, RAM, and so forth, and performs integrated control on the estimating device 2B. The ECU 21B has a characteristic amount extracting unit 22, an approaching vehicle estimating unit 23, a multi-class SVM data storage 24, and an approaching vehicle detecting unit 25. The ECU 21B receives sound data (electric signal) collected by each microphone, from the sound collecting device 20, and performs preprocessing on the sound data in the same manner as the ECU 21B of the first embodiment. In the second embodiment, the characteristic amount extracting unit 22 and the approaching vehicle estimating unit 23 correspond to the above-mentioned "class determining unit" and "sound source estimating unit", and the approaching vehicle detecting unit 25 corresponds to the above-mentioned "sound source detecting unit" and "correcting unit".

The characteristic amount extracting unit 22 and the approaching vehicle estimating unit 23 are substantially identical with those of the first embodiment, and thus will not be described. The characteristic amount extracting unit 22 calculates the CSP coefficient (cross-correlation value) for use in the approaching vehicle detecting unit 25 and the delay of arrival, as characteristic amounts. Also, the multi-class SVM data storage 24 is substantially identical with that of the first embodiment, and thus will not be described.

The approaching vehicle detecting unit 25 determines, by the CSP method, whether a peak value of the CSP coefficient (cross-correlation value) extracted by the characteristic amount extracting unit 22 is larger than a threshold value (initial value). The threshold value (initial value) is a threshold value generally used in the CSP method for detecting the running sound of the vehicle, so as to determine whether the running sound of the vehicle (sound source) is surely present. The threshold value is set by actual-vehicle experiment, or the like. When the peak value of the CSP coefficient is larger than the threshold value, the approaching vehicle detecting unit 25 determines that an approaching vehicle (sound source) is present, determines the moving direction (approaching direction) of the approaching vehicle based on change in the delay of arrival with time, and calculates the distance to the approaching vehicle, based on the delay of arrival. When the peak value of the CSP coefficient is equal to or smaller than the threshold value, the approaching vehicle detecting unit 25 determines that there is no approaching vehicle.

Then, the approaching vehicle detecting unit 25 compares the result of detection by the above CSP method with the result of estimation obtained by the approaching vehicle estimating unit 23 according to the multi-class SVM. If it is found from the comparison that an approaching vehicle is detected by the CSP method and the approaching vehicle is detected by the multi-class SVM, and that the distance to the approaching vehicle, which is calculated by the CSP method, is approximately equal to the distance to the approaching vehicle, which is estimated by the multi-class SVM, the reliability of each detection is high, and the reliability of the CSP coefficient is also high. Thus, when the distance to the approaching vehicle calculated by the CSP method is approximately equal to the distance to the approaching vehicle estimated by the multi-class SVM, the threshold value used in the CSP method is set to a smaller value than the initial value, so that the approaching vehicle (sound source) is more likely to be detected. The degree by which the threshold value is reduced is set by actual-vehicle experiment, or the like. When the threshold value is reduced, the amount of reduction of the threshold value may be varied depending on the degree of reliability. In some cases, the CSP coefficient is temporarily calculated as a low value due to an influence of noise on the collected sound, for example, even though an approaching vehicle (sound source) is present; therefore, the threshold value is set to a smaller value when the reliability is high so that the approaching vehicle (sound source) can be detected even in the above cases. Then, the approaching, vehicle detecting unit 25 determines by the CSP method, using the reduced threshold value (corrected value), whether the peak value of the CSP coefficient is larger than the threshold value (corrected value), and obtains the moving direction of the approaching vehicle and the distance to the approaching vehicle when the peak value of the CSP coefficient is larger than the threshold value.

Figure 6A:
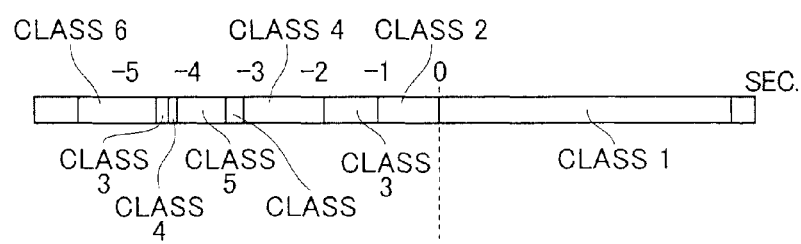
Figure 6B:
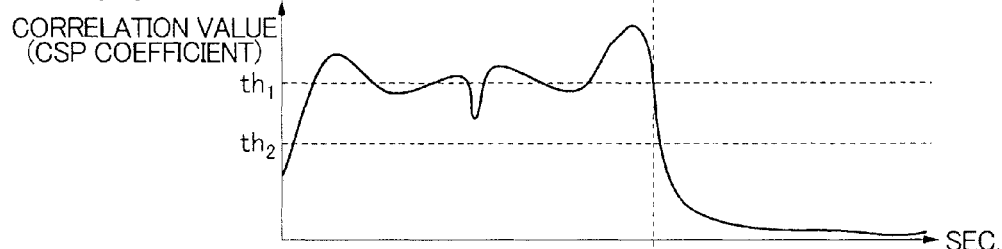
Figure 6C:
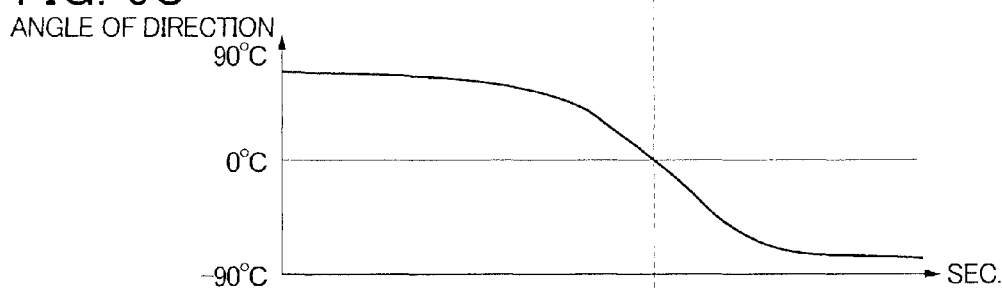

FIGS. 6A-6E show one example of processing result obtained by the estimating device 2B. In this example, an approaching vehicle moves from the left to the right on an intersecting road located ahead of or in front of the self-vehicle. In FIG. 6A, 0 sec. is a reference point in front of the self-vehicle, and the angle of direction relative to the approaching vehicle turns from a positive value to a negative value at the time point of 0 sec., as shown in FIG. 6C. The absolute value of the angle of direction, which corresponds to an approximate distance to the approaching vehicle, largely changes in the vicinity of the front of the self-vehicle, and is less likely to change as the approaching vehicle moves away from the self-vehicle.

FIG. 6A shows the result of class determination made by the approaching vehicle estimating unit 23 according to the multi-class SVM, in which almost correct classes are determined, in the order of Class 6, Class 5, Class 4, Class 3, and Class 2 corresponding to respective time intervals before passing the front of the self-vehicle. However, characteristic amounts vary due to an influence of noise on the collected sound, for example, and Class 3, etc. is determined between Class 6 and Class 5 and between Class 5 and Class 4. The distance to the approaching vehicle can be calculated from the set time of each class thus determined.

Figure 6D:
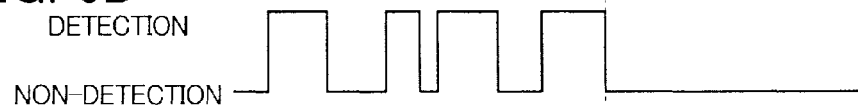

FIG. 6B indicates changes in the correlation value (CSP coefficient) with time, and the threshold value $th_1$ of the initial value, and FIG. 6D shows detection/non-detection of an approaching vehicle, based on the result of comparison between the correlation value (CSP coefficient) and the threshold value $th_1$. In the case of this example, the correlation value is temporarily reduced due to an influence of noise, for example; therefore, if the detection/non-detection is determined based on the threshold value $th_1$, there are some intervals in which no approaching vehicle is detected, as shown in FIG. 6D, and detection and non-detection of the approaching vehicle is repeated.

Figure 6E:
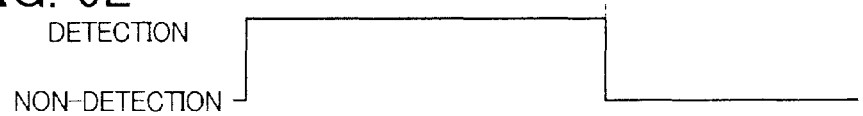

Suppose that the distance to the approaching vehicle, which is calculated by the CSP method, is approximately equal to the distance to the approaching vehicle, which is estimated by the multi-class SVM, and the threshold value is set to a threshold value $th_2$ that is smaller than the threshold value $th_1$. In this case, the correlation value (CSP coefficient) continuously exceeds the threshold value $th_2$, as shown in FIG. 6B. As a result, an approaching vehicle can be continuously detected with stability, as shown in FIG. 6E.

Referring to FIG. 1, FIG. 5 and FIGS. 6A-6E, the operation of the approaching vehicle detection system according to the second embodiment of the invention will be described. In particular, the operation of the estimating device 2B will be described with reference to the flowchart of FIG. 7. The flowchart of FIG. 7 illustrates the flow of processing performed in the estimating device 2B. The operation of the learning device 1 is substantially the same as that of the first embodiment, and thus will not be described.

The estimating device 2B is installed on each vehicle, and learned data stored in the multi-class SVM data storage 14 of the learning device 1 is stored in the multi-class SVM data storage 24 of the estimating device 2B.

In each vehicle, each microphone of the sound collecting device 20 collects ambient sound outside of the vehicle, converts the collected sound into an electric signal, and transmits the electric signal to the ECU 21B (step S20 in FIG. 7). The ECU 21B receives sound data of the two or more microphones, and performs preprocessing on two or more sets of sound data received from the respective microphones.

Each time the ECU 21B receives sound data of each microphone from the sound collecting device 20, the ECU 21B extracts characteristic amounts, using the sound data of each microphone which has been subjected to preprocessing (step S21), and calculates the CSP coefficient (step S22). It is to be noted that the CSP coefficient is a part of fourteen characteristic amounts used by the multi-class SVM.

Then, the ECU 21B determines which class to which the extracted fourteen characteristic amounts belong, based on the learned data stored in the multi-class SVM data storage 24 (step S23). The ECU 21B estimates approaching conditions of a vehicle approaching the self-vehicle, according to the class thus determined (step S24). If there is a class to which the characteristic amounts belong, the ECU 21B determines that an approaching vehicle (sound source) is present, and obtains the approaching time (distance), moving direction, etc. of the approaching vehicle based on the class thus determined.

Also, the ECU 21B determines whether an approaching vehicle (sound source) is present, by comparing the peak value of the CSP coefficient with the threshold value (the initial value), and obtains the distance to the approaching vehicle based on the delay of arrival when it is determined that an approaching vehicle is present, so that the distance can be used in threshold-value processing.

When an approaching vehicle is detected by the multi-class SVM and the approaching vehicle is also detected by the CSP method, the ECU 21B compares the distance to the approaching vehicle obtained by the multi-class SVM with the distance to the approaching vehicle obtained by the CSP method, and sets the threshold value of the CSP method to a smaller threshold value when the above distances are approximately equal (step S25). In other cases, the initial value of the threshold value of the CSP method is maintained. Then, the ECU 21B determines, using the corrected threshold value or the initial threshold value, whether an approaching vehicle is present by comparing the peak value of the CSP coefficient with the threshold value. When the ECU 21B determines that an approaching vehicle is present, it obtains the distance to the approaching vehicle, the moving direction, etc. based on the delay of arrival (step S26). Then, the ECU 21B generates approaching vehicle information, based on the result of detection obtained in step S26, and transmits the approaching vehicle information to the driving assist device 3.

According to the approaching vehicle detection system of the second embodiment, the threshold value of the CSP method is corrected based on the result of detection by the CSP method and the result of detection by the multi-class SVM, so that an approaching vehicle can be detected by the CSP method with improved stability even when the CSP coefficient is reduced due to an influence of noise, for example.

Referring to FIGS. 8A-8E, the manner of setting classes for use in the multi-class SVM will be described in greater detail. Each of FIGS. 8A-8E shows one example of a set of classes used in the multi-class SVM and set according to the road shape and traffic regulations.

Each vehicle runs on a road, and therefore moves along the shape of the road. Also, the vehicle runs according to traffic regulations. Accordingly, if classes are set based on the individual road shapes and traffic regulations included in map information, detailed and accurate classes can be set.

For example, when a road CR that intersects with a road MR on which the self-vehicle MV is present, at an intersection of a crossroad, is a double lane (i.e., has one lane each way), as shown in FIG. 8A, five classes $C_{6R}, C_{5R}, C_{4R}, C_{3R}, C_{2R}$ that are separated in terms of time are set on the left-hand side (before passing the front) of the self-vehicle MV, and one class $C_{1R}$ is set on the right-hand side (after passing the front) of the self-vehicle MV, on the lane of the road CR from the left-hand side to the right-hand side of the self-vehicle MV. Also, five classes $C_{6L}, C_{5L}, C_{4L}, C_{3L}, C_{2L}$ that are separated in terms of time are set on the right-hand side (before passing the front) of the self-vehicle MV, and one class $C_{1L}$ is set on the left-hand side (after passing the front) of the self-vehicle MV, on the lane of the road CR from the right-hand side to the left-hand side of the self-vehicle MV. Further, one class $C_{1F}$ is set on the opposed side of the road MR ahead of or in front of the self-vehicle MV and the inside of the intersection, which can be visually recognized from the self-vehicle MV.

When a road CR that intersects with a road MR of the self-vehicle MV, at an intersection of a T-junction, has no lane and permits bidirectional traffic, as shown in FIG. 8B, five classes $C_{6R}, C_{5R}, C_{4R}, C_{3R}, C_{2R}$ that are separated in terms of time are set on the left-hand side (before passing the front) of the self-vehicle MV, and one class $C_{1R}$ is set on the right-hand side (after passing the front) of the self-vehicle MV, with respect to the moving direction from the left-hand side to the right-hand side of the self-vehicle MV on the road CR. Also, five classes $C_{6L}, C_{5L}, C_{4L}, C_{3L}, C_{2L}$ that are separated in terms of time are set on the right-hand side (before passing the front) of the self-vehicle MV, and one class $C_{1L}$ is set on the left-hand side (after passing the front) of the self-vehicle MV, with respect to the moving direction from the right-hand side to the left-hand side of the self-vehicle MV on the road CR. Further, one class $C_{1F}$ is set in the inside of the intersection ahead of the self-vehicle V, on the road MR.

When a road CR that intersects with a road MR of the self-vehicle MV, at an intersection of a crossroad, has no lane and permits bidirectional traffic, as shown in FIG. 8C, respective classes are set on the road CR in the same manner as in the case of the T-junction of FIG. 8B. Further, one class $C_{1F}$ is set on the opposed side of the road MR ahead of the self-vehicle MV and the inside of the intersection.

When a road CR that intersects at right angles with a road MR of the self-vehicle MV, at an intersection of a modified crossroad, has no lane and permits one-way traffic toward the intersection, and a road SR that intersects obliquely with the road MR of the self-vehicle MV has no lane and permits one-way traffic toward the intersection, as shown in FIG. 8D, five classes $C_{6L}, C_{5L}, C_{4L}, C_{3L}, C_{2L}$ that are separated in terms of time are set with respect to the moving direction from the right-hand side of the self-vehicle MV toward the intersection on the road CR, and five classes $C_{6S}, C_{5S}, C_{4S}, C_{3S}, C_{2S}$ that are separated in terms of time are set with respect to the moving direction from the diagonally backward left-hand side of the self-vehicle MV toward the intersection on the road SR. Further, one class $C_{1F}$ is set on the opposed side of the road MR ahead of the self-vehicle MV and the inside of the intersection.

When a road CR that intersects with a road MR of the self-vehicle MV, at an intersection or junction of five roads, has no lane and permits bidirectional traffic, and a road SR that intersects obliquely with the road MR of the self-vehicle MV has no lane and permits one-way traffic toward the intersection, as shown in FIG. 8E, respective classes are set on the road CR and the road MR in the same manner as in the case of the crossroad of FIG. 8C, and five classes $C_{6S}, C_{5S}, C_{4S}, C_{3S}, C_{2S}$ that are separated in terms of time are set with respect to the moving direction from the diagonally backward left-hand side of the self-vehicle MV toward the intersection on the road SR.

In setting of each class, a given speed of the vehicle running on each road (e.g., the speed limit of the road) may be assumed, and the width of each class set on the road, as measured in the vehicle running direction, may be varied according to the assumed speed. As the vehicle speed is higher, the distance travelled by the vehicle in one second becomes longer, and thus the width of each class is increased.

In this case, the learning device 1 obtains information on the current position of the self-vehicle, during collection of sound at the sound collecting device 10. The computer 11 of the learning device 1, which is provided with map information (road shape information, traffic regulation information), receives information on the current position of the self-vehicle, and performs classification by learning according to the multi-class SVM, in view of the shape of the road at the current position of the self-vehicle and traffic regulations for the road. Also, the estimating device 2A, 2B obtains information on the current position of the self-vehicle, during collection of sound at the sound collecting device 20. The ECU 21A, 21B of the estimating device 2A, 2B, which is provided with map information, receives information on the current position of the self-vehicle, and determines a class in view of the shape of the road at the current position of the self-vehicle and traffic regulations for the road, based on the learned data of the multi-class SVM which additionally takes account of the road shape and traffic regulations. Thus, the more appropriate classes can be easily set by setting classes according to the road shape and traffic regulations.

Also, classes may be set according to the type of the vehicle. Since the running sound differs between a large vehicle and an ordinary vehicle, for example, the characteristic amounts of sound also differ between these types of vehicles. Accordingly, the type of the vehicle can be determined based on the sound characteristic amounts, and the classes may be set in view of the type of the vehicle as well as the above-indicated parameters. The vehicles may be roughly classified into several types, such as a large vehicle, ordinary passenger vehicle, light passenger vehicle, and a motorcycle, or may be classified into more detailed types.

In this case, the type of the approaching vehicle is changed from one type to another, and the sound collecting device 10 of the learning device 1 collects sound at each microphone, for each type of vehicle, during running of the approaching vehicle. The computer 11 of the learning device 1 performs classification by learning according to the multi-class SVM, in view of the type of the vehicle as well as the above-indicated parameters. Also, the ECU 21A, 21B of the estimating device 2A, 2B determines a class in view of the type of the vehicle, too, based on the learned data of the multiple-class SVM which additionally takes account of the type of the vehicle. Thus, by performing classification in view of the type of the vehicle, the conditions of the approaching vehicle (sound source) can be estimated in greater detail, and the approaching vehicle can be detected with improved accuracy.

In the approaching vehicle detection system, the classes are set according to various parameters as described above, in addition to the position and the moving direction, so that various conditions of the approaching vehicle can be estimated. The classes may also be set in view of a parameter or parameters other than those as indicated above. While the classes are set with reference to a point in time at which the approaching vehicle passes the front of the self-vehicle, another point in time may be used as a reference.

While some embodiments of the invention have been described above, the present invention is not limited to the above-described embodiments, but may be embodied in various forms.

While the sound source detection system of the invention is used as the approaching vehicle detection system for detecting an approaching vehicle (running sound of a vehicle as a sound source) in the illustrated embodiments, the sound source detection system may be used as a system for detecting a sound source other than a vehicle. While the invention is applied to the system in which the detected approaching vehicle information is provided to the driving assist system in the illustrated embodiments, the system may be otherwise configured. For example, the approaching vehicle detection system may be incorporated as an approaching vehicle detecting function in the driving assist system, or the approaching vehicle detection system may incorporate a warning function, or the like.

While the learning device that performs learning in advance and the estimating device that actually estimates an approaching vehicle are provided separately from or independently of each other in the illustrated embodiments, these devices may be provided as an integrated device. In the case of the integrated device, in particular, classification is performed off-line based on sound data collected during running of the vehicle, and an approaching vehicle is detected in real time, using data obtained through the classification.

While the multi-class SVM is used as a multi-class pattern recognition method in the illustrated embodiments, other multi-class pattern recognition methods may be used.

While the sound collecting device consists of two or more microphones, which constitute one or more pairs of microphones, in the illustrated embodiments, the invention may also be applied to the case where the sound collecting device has only one microphone. When the sound collecting device has one microphone, the processing load is reduced, but the delay of arrival and the CSP coefficient (correlation value) cannot be obtained as characteristic amounts.

While fourteen characteristic amounts are used as the characteristic amounts in the illustrated embodiments, only a part of the fourteen characteristic amounts may be used, or other characteristic amounts may be used in addition to the fourteen characteristic amounts, or other characteristic amounts may be used in addition to a part of fourteen characteristic amounts.

The invention claimed is:

1. A sound source detection system for detecting a sound source based on sound collected by a sound collecting device, comprising:
a classifying unit configured to extract a plurality of characteristic amounts from the sound collected by the sound collecting device, and to set a plurality of classes according to a position of the sound source by a multi-class pattern recognition, using the characteristic amounts;
a class determining unit configured to extract the characteristic amounts from the sound collected by the sound collecting device when detecting the sound source, and to determine a class to which the extracted characteristic amounts belong, from the plurality of classes set by the classifying unit;
a sound source estimating unit configured to estimate the sound source, based on the class determined by the class determining unit;
a sound source detecting unit configured to calculate a correlation value of sounds respectively collected by a plurality of microphones that constitute the sound collecting device, and to detect the sound source by comparing the calculated correlation value with a threshold value; and
a correcting unit configured to correct the threshold value of the sound source detecting unit, based on a detection result obtained by the sound source detecting unit and an estimation result obtained by the sound source estimating unit, wherein
the sound source detecting unit detects the sound source by comparing the correlation value with the threshold value corrected by the correcting unit.

2. The sound source detection system according to claim 1, wherein:
the sound source estimating unit estimates a distance to the sound source, and the sound source detecting unit calculates a distance to the sound source, and
the correcting unit corrects the threshold value of the sound source detecting unit by setting the threshold value to a smaller value, when the sound source estimating unit and the sound source detecting unit detect the sound source, and the distance to the sound source estimated by the sound source estimating unit is approximately equal to the distance to the sound source calculated by the sound source detecting unit.

3. The sound source detection system according to claim 1 wherein:
the sound collecting device includes at least one pair of microphones; and
the plurality of characteristic amounts include a delay of arrival of sound and a correlation value, which are extracted from each of the at least one pair of microphones.

4. The sound source detection system according to claim 1, wherein the classifying unit sets the plurality of classes according to a length of time it takes for the sound source to reach a reference point in time.

5. The sound source detection system according to claim 1, wherein the classifying unit sets the plurality of classes according to a moving direction of the sound source.

6. The sound source detection system according to claim 1, wherein:
   the sound source is a vehicle approaching a self-vehicle on which the sound source detection system is installed; and
   the classifying unit sets the plurality of classes according to a shape of a road on which the vehicle is running and a shape of a road on which the self-vehicle is present.

7. The sound source detecting system according to claim 1, wherein:
   the sound source is a vehicle approaching a self-vehicle on which the sound source detection system is installed; and
   the classifying unit sets the plurality of classes according to traffic regulations for a road on which the vehicle is running and a road on which the self-vehicle is present.

8. The sound source detection system according to claim 1, wherein:
   the sound source is a vehicle approaching a self-vehicle on which the sound source detection system is installed; and
   the classifying unit sets the plurality of classes according to a type of the approaching vehicle.

9. The sound source detection device according to claim 1, wherein
   the classifying unit classifies the plurality of classes according to a moving direction of the sound source.

10. The sound source detection device according to claim 1, wherein
    the classifying unit classifies the plurality of classes according to a shape of a road and/or traffic regulations.

11. The sound source detection device according to claim 1, wherein
    the classifying unit classifies the plurality of classes according to a type of the vehicle.

* * * * *